United States Patent
Gilberton et al.

(10) Patent No.: US 10,013,186 B2
(45) Date of Patent: Jul. 3, 2018

(54) STORAGE DEVICE MANAGEMENT METHOD AND APPARATUS CORRESPONDING COMPUTER PROGRAM PRODUCT AND NON-TRANSITORY COMPUTER READABLE MEDIUM

(71) Applicant: THOMSON LICENSING, Issy de Moulineaux (FR)

(72) Inventors: Philippe Gilberton, Geveze (FR); Eric Gautier, Rennes (FR); Christopher Howson, Corps-Nuds (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 164 days.

(21) Appl. No.: 14/734,158

(22) Filed: Jun. 9, 2015

(65) Prior Publication Data
US 2015/0355856 A1 Dec. 10, 2015

(30) Foreign Application Priority Data
Jun. 10, 2014 (EP) .................................... 14305871

(51) Int. Cl.
| | | |
|---|---|---|
| *H04N 5/781* | (2006.01) | |
| *G06F 3/06* | (2006.01) | |
| *G11B 27/034* | (2006.01) | |
| *G11B 27/11* | (2006.01) | |
| *G11B 27/36* | (2006.01) | |
| *H04N 21/4147* | (2011.01) | |
| *H04N 21/4335* | (2011.01) | |
| *H04N 21/442* | (2011.01) | |

(52) U.S. Cl.
CPC ............ *G06F 3/0619* (2013.01); *G06F 3/065* (2013.01); *G06F 3/067* (2013.01); *G11B 27/034* (2013.01); *G11B 27/11* (2013.01); *G11B 27/36* (2013.01); *H04N 5/781* (2013.01); *H04N 21/4147* (2013.01); *H04N 21/4335* (2013.01); *H04N 21/4424* (2013.01); *H04N 21/44222* (2013.01)

(58) Field of Classification Search
None
See application file for complete search history.

(56) References Cited

U.S. PATENT DOCUMENTS

| | | |
|---|---|---|
| 7,394,967 B1 | 7/2008 | Potrebic et al. |
| 7,493,646 B2 | 2/2009 | Ellis |
| 7,769,977 B2 | 8/2010 | Roh et al. |
| 7,882,074 B2 | 2/2011 | Lee et al. |
| 8,364,021 B2 | 1/2013 | Kuhn |

(Continued)

FOREIGN PATENT DOCUMENTS

| | | |
|---|---|---|
| CN | 101098431 | 5/2012 |
| EP | 1929774 | 6/2008 |

(Continued)

OTHER PUBLICATIONS

Search Report dated Sep. 22, 2014.

*Primary Examiner* — Eileen M Adams
(74) *Attorney, Agent, or Firm* — Meagher Emanuel Laks Goldberg & Liao, LLP

(57) ABSTRACT

The invention relates to a storage device management method allowing to manage the storage space, on a storage device, by proposing to an end user to store a new content he was going to consume if its storage determined size is lower than an already stored content size.

12 Claims, 3 Drawing Sheets

(56) References Cited

U.S. PATENT DOCUMENTS

| | | | |
|---|---|---|---|
| 2002/0012517 A1 | 1/2002 | Ichioka et al. | |
| 2002/0118954 A1 | 8/2002 | Barton et al. | |
| 2002/0138838 A1 | 9/2002 | Peters et al. | |
| 2003/0206719 A1 | 11/2003 | Bumgardner et al. | |
| 2005/0238317 A1 | 10/2005 | Horiguchi et al. | |
| 2007/0300262 A1 | 12/2007 | Kim | |
| 2008/0098182 A1 | 4/2008 | Takashimizu | |
| 2008/0235734 A1 | 9/2008 | Verhaegh | |
| 2012/0102317 A1* | 4/2012 | Mathur | G06F 21/10 713/156 |
| 2012/0137328 A1* | 5/2012 | Hanzawa | H04N 21/4355 725/50 |
| 2013/0067187 A1* | 3/2013 | Moss | G06F 3/0689 711/170 |
| 2013/0071093 A1 | 3/2013 | Hanks et al. | |
| 2013/0114940 A1 | 5/2013 | Merzon et al. | |
| 2013/0125169 A1 | 5/2013 | Barton et al. | |
| 2014/0172602 A1* | 6/2014 | Beddow | G06Q 20/123 705/21 |
| 2015/0142614 A1* | 5/2015 | Kagiwada | G06Q 30/04 705/26.81 |
| 2015/0142615 A1* | 5/2015 | Klein, Jr. | G06F 17/30017 705/26.82 |

FOREIGN PATENT DOCUMENTS

| | | |
|---|---|---|
| EP | 1467560 | 5/2013 |
| KR | 101233167 | 2/2013 |
| WO | WO0182598 | 11/2001 |
| WO | WO03091928 | 11/2003 |
| WO | WO2005076279 | 8/2005 |
| WO | WO2007038434 | 4/2007 |

\* cited by examiner

STORAGE DEVICE MANAGEMENT METHOD AND APPARATUS CORRESPONDING COMPUTER PROGRAM PRODUCT AND NON-TRANSITORY COMPUTER READABLE MEDIUM

This application claims the benefit, under 35 U.S.C. § 119 of European Patent Application No. 14305871.7, filed Jun. 10, 2014.

1. TECHNICAL FIELD

The invention concerns the management of media contents, and in particular the management of media contents stored in a limited capacity storage device.

More specifically, the invention relates to the management of the storage space, and finds particular application in the management of the storage space of a Personal Video Recorder (PVR), that many Internet Service Providers (ISP) provide for broadcast and/or broadband recording services. The PVR is either located in the Set Top Box, also called STB, as a Hard Disk Drive (HDD) or in the gateway as a Network Attached Storage (NAS).

2. BACKGROUND ART

The management of recorded media contents stored on a limited capacity storage device is a recurrent problem that many consumers experience in their everyday life.

For example, after some months of usage, usually the end user cumulates watched and also unwatched media contents that could be critical in term of storage space. Typically, this could result in no further recording functionality, if the end user does not clean up by himself the HDD or the NAS.

In the prior art, some solutions are proposed to help the end user manage his storage space.

For example, the documents US20030206719A1 and U.S. Pat. No. 7,882,074B2 propose an algorithm based on contents prioritization in order to save storage (HDD) space. For example, the algorithm deletes first the content which has the lowest priority. The criteria of prioritization can be chosen by the end user himself or based on the status of watched and unwatched contents.

According to the document U.S. Pat. No. 8,364,021B2, the classification and preferences determined by the end user save storage (HDD) space by deleting the content having the lowest interest.

A variant solution is described in the document U.S. Pat. No. 7,769,977B2, that estimates the end user content consumption time to anticipate content deletion and helps anticipate storage (HDD) space savings.

Thus, the prior art provides solutions based on prioritization, content consumption time, user preference or interest, for managing the storage space only by deleting recorded contents when the remaining free space is critical.

3. SUMMARY OF INVENTION

The present disclosure relates to a storage device management method, comprising:
    determining a storage size of a new content in the storage device,
    proposing to a user of the storage device to store, in the storage device, the new content and to render a stored content in the storage device, called recommended content, if the recommended content storage size is greater than the new content storage size.

Thus, the invention, according to its different embodiments, proposes a new and inventive way to manage the storage of media contents by providing some recommendation to the user in order to optimize the storage space, when the user requests the rendering or the recording of a content, called new content.

For example, it is proposed to the user to render, i.e. to view in the case of a video content or to listen in the case of an audio content, an already stored content instead of rendering the new content, when the stored content takes more space than the new one. Of course, the new content is stored for a later rendering, i.e. viewing in the case of a video content and listening for the case of an audio content. Consequently, the storage of the new content will take less space than the stored content, thus optimizing the storage space.

In another case, it is proposed to the user to render an already stored content in order to make available some storage place to record the new content, when the stored content takes more space than the new one. Of course, the new content is stored for a later consumption. Consequently, thanks to the space made available through the rendering of the stored content, the storage space is increased.

This new and inventive approach allows optimizing the storage space without any deletion of contents not already consumed by the user, thus without any loss of content for the user, on the contrary to several known solutions consisting in deleting the content having the lowest interest, or the lowest priority, or the oldest one even when they have not yet been consumed.

According to one embodiment, the recommended content may be an aggregation of several contents stored in the storage device, for example related to each other as several episodes of a series, in order to obtain a better optimization of the storage place.

For example, the storage size and, if needed, the duration of the new content can be obtained or determined from a TV program guide. Some other features of the new content can be obtained from the TV program guide, such as the category (film, documentary, sport, information, video clip, concert, . . . ), sub-category (related to film: comedy, drama, fiction/related to sport: football, baseball, . . . ) . . . .

According to different embodiments of the invention, the storage device may be also a rendering device, for example a TV with an embedded STB and storage disk, or a storage device connected to a rendering device, for example a NAS.

According to a particular embodiment, the method is implemented when the storage device is switched on and the recommendation is displayed on a user interface of the storage device.

Advantageously, the method further comprises determining a category and/or a sub-category of the new content and associating the recommended content with information related to its category and/or its sub-category.

Advantageously, the recommended content pertains to the same category and/or sub-category as said new content.

Indeed, the user is likely to be interested by the rendering of the recommended content, because it pertains to the same category/sub-category as the new content.

According to an embodiment of the invention, the method comprises:
    receiving a user's response indicating whether the user accepts the proposal;
    storing the new content and rendering the recommended content if the user's response is positive.

According to this embodiment, if the user agrees with the recommendation, the invention allows saving storage space, without any loss of content for the user.

Indeed, the recommended content will be rendered to the user and the new content will be stored in less space than the recommended content, thus making available more storage space in the storage device. Of course, the new content will be available to the user for a later rendering, while the user enjoys the recommended content.

Advantageously, the method also comprises checking if there is enough remaining storage space in the storage device to ensure the rendering of the recommended content whilst simultaneously storing the new content.

According to this embodiment, a content is recommended to the user only if the remaining storage space allows to record the new content. Indeed, the recommended content will be deleted from the storage device only after being completely rendered, or can be deleted later.

For example, checking if there is enough remaining storage space comprises comparing a remaining storage space size of the storage device with a predetermined threshold.

Indeed, the optimization of the storage space is more important when the remaining storage space is likely to be insufficient for later recordings.

For example, the recommendation could be conditioned to one or several graduated threshold(s) of the remaining storage space size. For example if 50% remains free, no recommendation is emitted, between 30% and 50% of free space, a recommendation is displayed once a week, if the free space is under 30% the recommendation is displayed each day, or every time the end user turns on his TV.

For example, the remaining storage space size is determined by a storage disk space monitoring and organizing device managing a process that could be launched as a background task.

According to an embodiment, the method comprises associating each stored content in the storage device with information indicating the number of times it has already been rendered, and selecting the recommended content using said information.

Indeed, the user is likely to be interested by the rendering of a content that he has not already consumed.

According to a particular embodiment, the method also comprises when a rendering of said new content has already started:

retrieving a part of said new content that has been missed for the storing, called the beginning of the new content;

storing the beginning of the new content in the storage device.

Thus, if the new content has already begun, it may be stored, and its beginning, i.e. the part that has been missed for the recording, may be retrieved, for a later complete consumption.

For example, this can happen if the user zaps on a new TV channel after the start of a TV program and if the user requests this TV program despite the fact that the rendering of its content has already started. In that case, if the method of the invention, according to one of its embodiments, is able to retrieve the beginning of the new content (corresponding to the unconsumed part of the content), a recommendation is provided to the user. If the user agrees, the invention, according to one of its embodiments, allows the recording of the new content, from the moment the users accepts the recommendation and the later recording of the beginning of the new content. The user will then be able to consume the whole new content.

The invention also concerns a storage device management apparatus comprising:

a determining module configured to determine a storage size of the new content in the storage device, a recommending module configured to propose to a user of the storage device to store, in the storage device, the new content and to render a stored content in the storage device, called recommended content, if the recommended content storage size is greater than the new content storage size.

The invention also concerns a computer program product downloadable from a communication network and/or recorded on a medium readable by computer and/or executable by a processor, comprising program code instructions for implementing the steps of the media content storage management method previously described.

The invention also concerns a non-transitory computer-readable medium comprising a computer program product recorded thereon and capable of being run by a processor, including program code instructions for implementing the steps of the media content storage management method previously described.

While not explicitly described, the present embodiments may be employed in any combination or sub-combination As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit," "module", or "system." Furthermore, aspects of the present principles can take the form of a computer readable storage medium. Any combination of one or more computer readable storage medium(s) may be utilized.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a random access memory (RAM); a read-only memory (ROM); an erasable programmable read-only memory (EPROM or Flash memory); a portable compact disc read-only memory (CD-ROM); an optical storage device; a magnetic storage device; or any suitable combination of the foregoing.

4. BRIEF DESCRIPTION OF DRAWINGS

Other characteristics and advantages of embodiments of the invention shall appear when reading the following description, provided by way of a non-restricted and indicative example (all of the embodiments of the invention are not limited to the characteristics and advantages of the embodiments described hereinafter), and the annexed drawings, wherein.

5. DESCRIPTION OF EMBODIMENTS

Different embodiments of the invention propose a method to better manage the storage space, on a storage device, by proposing to the end user to record a content he was going to consume, or to record, if its storage size is lower than a stored content, also called a "remaining to consume content". The advantageous consequence is a storage space saving (for example disk space), and a warranty to get enough size for next recording. Moreover, the optimization can be made, for the end user, without any deletion of a content he wanted to keep stored.

The different embodiments of the invention are thus based on a preventive suggestion and a smooth way offered to the end user before having to delete files (corresponding to stored media content), prior to a recording, particularly when the user is almost out of storage space.

According to the different embodiments of the invention, the storage device may be part of a unique device performing storage and rendering, or attached to a distinct rendering device. In this last case, the storage device and the rendering device may be considered as related modules for example. In all cases, we will consider a "storage device".

For example, an application of the invention, according to its different embodiments, concerns a system wherein the end user disposes of a storage device (HDD, NAS or equivalent) to record his favorite TV programs. The storage device can be part of the STB or the Gateway. It could be also connected as an external HDD to, for example, the TV set or a satellite receiver as long as it has the appropriate interface (USB port is a typical one). For example, the proposed service, according to the different embodiments of the invention, is offered to the end user by the ISP that provides the HDD, NAS or an equivalent storage service.

Figure 1:
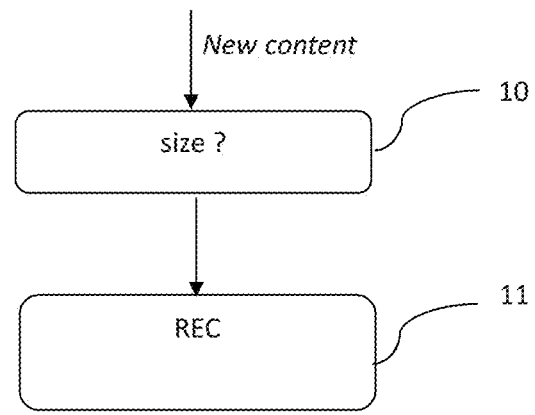
FIG. 1 shows the steps of the method according to an embodiment of the invention.

Thus, the proposed method for the storage device management, according to an embodiment of the invention illustrated in FIG. 1, comprises first determining, at step 10, the storage size of a new content, requested to be consumed or to be stored by an end user. This content is called a new content.

For example, according to a first use case, the new content corresponds to a TV program (a film, a series, a documentary . . . ), or a radio program, the end user wants to consume.

In another example, according to a second use case, the new content corresponds to a TV program (a film, a series, a documentary . . . ), or a radio program, the end user wants to record, for a later consumption. In this second use case, the recording of the new content may be required by the end user through a scheduled TV program recording or as a one-time action.

Moreover, the proposed method for the storage device management obtains a list of stored media contents, on said storage device, wherein each media content may be associated with its storage size.

Then, the proposed method for the storage device management comprises, at step 11, recommending to the end user to consume a stored content in the storage device, called recommended content, if the recommended content storage size is greater than the new content storage size. Of course, it is also proposed to the user, in the recommendation, to store the new content for later consumption.

Consequently, if the user accepts the recommendation, the storage space will be optimized, because the storage of the new content will take less space than the actual storage of the recommended content. Moreover, no stored content will be deleted without being consumed before by the end user, on the contrary to some prior art solutions.

For example, the recommendation is displayed on the storage device 15 (FIG. 2), or a rendering device connected to the storage device, and requires a response from the end user, indicating whether he accepts the recommendation. This can for example be made through an interactive application displayed on the TV of the end user. The notification of the recommended content may also be displayed as a message, or in a personalized EPG.

Figure 2:
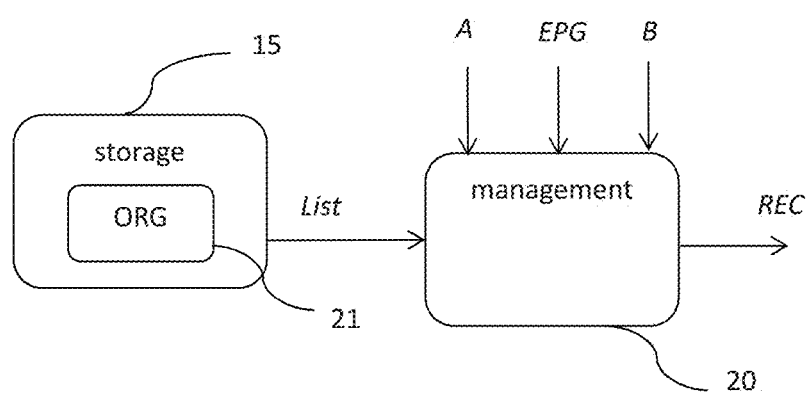
FIG. 2 illustrates an example of a storage system according to an embodiment of the invention.

For example, as illustrated in FIG. 2 according to an embodiment of the invention, the list of stored contents is provided to a storage device management apparatus 20 (implementing the steps of the storage device management method) by the storage device 15, for instance by a storage space monitoring and organizing module 21 within the storage device 15.

Alternatively, the storage space monitoring and organizing module 21 may be part of the storage device management apparatus 20 or may be a distinct device from the storage device 15 and the storage device management apparatus 20.

According to an embodiment, the storage space monitoring and organizing module 21 manages a process that could be launched as a background task that will be consulted each time the storage device management method is implemented.

According to a variant of this embodiment, the storage space monitoring and organizing module 21 provides the stored contents list only if the remaining storage space size on the storage device is lower than a predetermined threshold. Indeed, no recommendation is needed if the remaining storage space corresponds to the potential storage of a great number of contents. On the contrary, when the remaining storage space becomes critical, there is a need to optimize the management of the storage space.

For example, the notification service could be conditioned to one or several graduated threshold(s) of the remaining storage space size.

For example:
if 50% remains free, no recommendation is emitted;
between 30% and 50% of free space, a recommendation is displayed once a week;
if the free space is under 30%, the recommendation is displayed each day or every time the end user turns on his TV.

Moreover, the storage space monitoring and organizing module 21 also verifies that there is enough remaining storage space throughout the period when the end user may be consuming the recommended content whilst simultaneously recording the new content. Indeed, the storage space corresponding to the recommended content will be available only after the total rendering of this content. It is thus required that the remaining free space is highest than the storage size of the new content.

In another example, a temporary storage space may be available to record the new content during the rendering of the recommended content. In that case, the stored new content may then be transferred on the storage device, once the space corresponding to recommended content has been released.

An alternate solution would be to propose the end user to preferably store the new content in Standard Definition (SD) instead of High Definition (HD), to save more storage space.

As illustrated in FIG. 2, the storage management device 20 also may also use information such as a personal calendar A of the end user (providing the end user's availability), an Electronic Program Guide, or EPG (providing the storage size of the new content for example) and the TV program recording schedule B (for the second use case).

Figure 3:
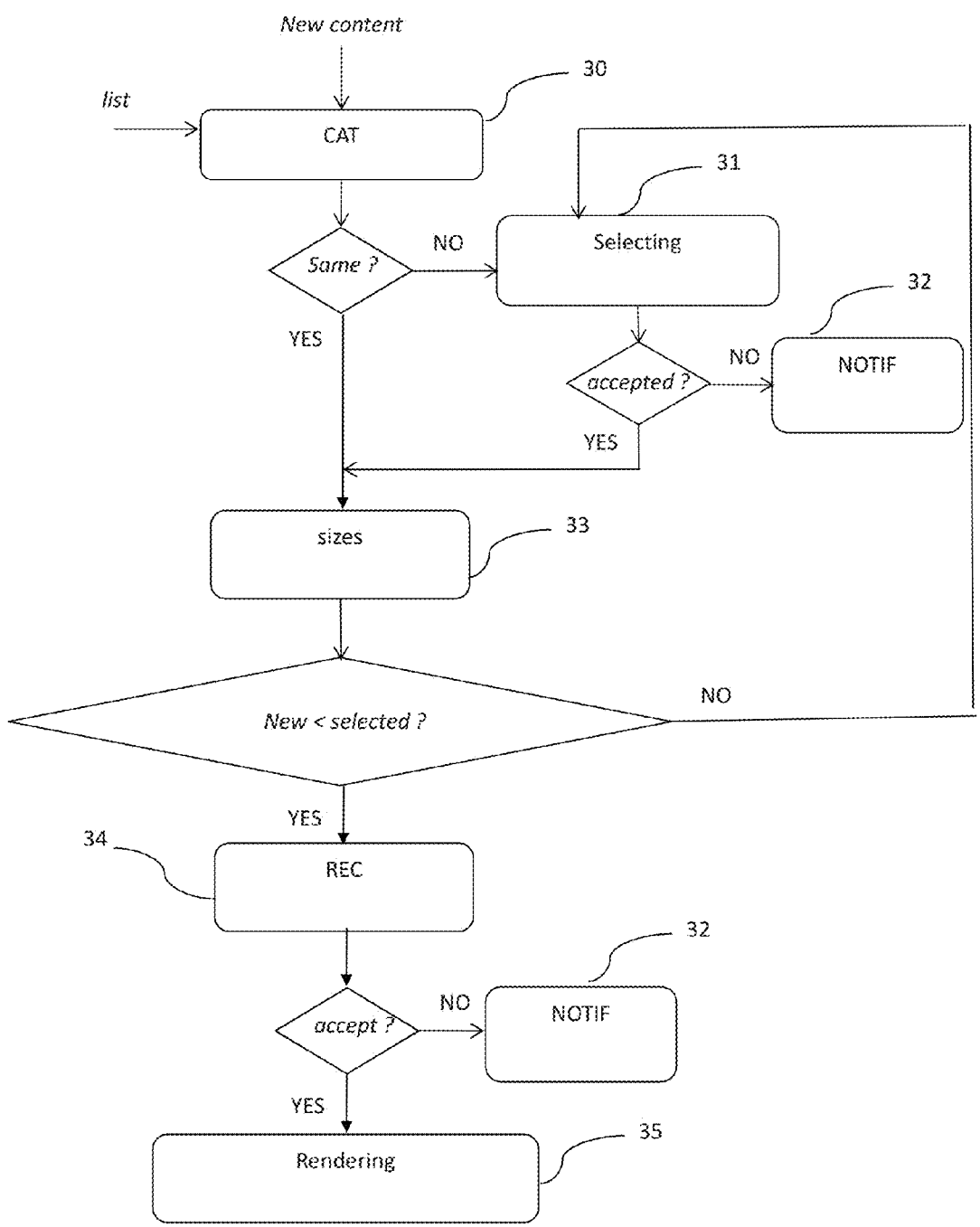
FIG. 3 illustrates the operation of an embodiment of the invention.

As illustrated in FIG. 3, some other information may be used for the management of the storage device, in order to provide the end user with the best recommendation, in terms of content to be consumed instead of the new content he wants to consume.

For example, the list of stored contents contains sorted contents, according to their category (film, documentary, sport, information, video clip, concert, . . . ) and/or their sub-category (related to film: comedy, drama, fiction/related to sport: football, baseball, . . . ). Thus, the recommended content may pertain to the same category and/or sub-category as the new content.

An information regarding the sequential relationship of a content to other content(s) (for example "second of a series of five related contents") may also be provided, for example as an indication associated with the content, in the list. Thus, the recommend content may comprise an aggregation of several contents, as several episodes of a series. Moreover, a best recommendation would be to propose the first content(s) of a sequential relationship, and not the last one.

Moreover, another information may be useful to provide the end user with a better recommendation, which concerns the number of times that a content has already been consumed by the end user. Indeed, it would be more opportune to propose an unconsumed stored content, rather than a content already consumed one or many times.

The profile of the end user (providing his TV program preferences) and the end user context (providing for example his mood, availability, . . . ) may also be used to select the recommended content, as well as other context information (weather, time of the day, . . . ).

As illustrated in the embodiment of FIG. 3, the list of stored contents to be proposed to the end user comprises contents sorted by their category and/or sub-category. Thus, when the user requests a content in order to consume or store it, the storage device management apparatus first compares, in step 30, the category/sub-category of the new content to those of the stored contents of the list.

If no stored content of the list pertains to the same category/sub-category as the new content, other criteria may be used in order to select, in step 31, one or more stored contents to be recommended to the end user. For example, the profile of the end user may be used to select one or more stored contents pertaining to a preferred category. If one or more stored contents are selected thanks to other criteria, a sub-list is provided with these selected stored contents. If not accepted by the user, a warning notification is displayed to the user, at step 32, indicating that the remaining free storage space is decreasing.

If one or more stored contents pertaining to the same category/sub-category of the new content have been selected, a sub-list is provided with these selected contents, and their storage sizes are compared, in step 33, with the storage size of the new content.

If the new content storage size is higher than the selected contents size, other criteria may be used in order to select, in step 31, one or more stored contents to be recommended to the end user.

If the new content storage size is lower than the size of one of the selected contents, a recommendation is displayed to the end user, in a step 34, and a corresponding response is awaited.

If the end user refuses the recommendation, i.e. refuses to consume the recommended content in place of the new content, a warning notification is displayed to the user, in step 32, indicating that the remaining free storage space is decreasing.

If the end user accepts the recommendation, i.e. accepts to consume the recommended content in place of the new content, and accepts to record the new content for a later consumption, the recommended content is rendered to the end user, and the new content is stored in the storage device, in step 35.

Figure 4A:
FIGS. 4a and 4b illustrate the storage space of the storage device of FIG. 2 respectively before and after the method implementation, according to an embodiment of the invention.
Figure 4B:

An example of result obtained by this embodiment of the invention is illustrated in FIGS. 4a and 4b, comparing the storage space size before the implementation of the invention (FIG. 4a) and after (FIG. 4b). In this case, the new content is the Horror film 2, and the recommended content is the Horror film 1, having a higher size as the Horror film 2. Thus, as the user accepts the recommendation, i.e. viewing the Horror film 1 instead of the Horror film 2, the storage space is optimized, without deleting any content.

In a first use case, and according to a first variant, the end user is going to consume a horror film (Horror film 2) at 20h30 on channel1.

Prior the end user begins to consume the Horror film 2 of channel1 and in order to anticipate the recording process, the service of the invention will check the evening TV program of channel1 and estimate the size of the Horror film 2. Then, it will search in the horror films sub-list if one horror film is higher in size than the upcoming one (Horror film 2) the end user is going to consume. If the size of one of the stored horror films (for example Horror film 1) is higher, the storage device management apparatus 20 will notify the end user and recommend him to view Horror film 1; in the other case it will not notify him and lets the end user consume the film of his choice (Horror film 2).

If there are several horror films presenting a size higher than the new content, more criteria of classification of the sub-list could be used, for example in order to propose firstly to the user:

the unconsumed horror films; and/or
the biggest in size; and/or
the first of a series, if the films are related; and/or
if all are unconsumed, the oldest one.

In this case, the recommendation could be displayed as a list of recommended contents, and not only one recommended content. Then, it is up to the end user to choose what content fits the best with the mood of the moment.

According to another embodiment, if the end user likes the surprise, a recommendation based on a slightly different content category or sub-category could be relevant to propose as well.

In this first use case, and according to a second variant, the end user zaps without notice to another upcoming TV program, on another channel. Then the service of the invention can not anticipate and it means that, in many cases, the TV program to which the end user has zapped has already started. The consequence is to miss the recording of the beginning of the ongoing TV program (i.e. the new content).

Thus, it is needed to retrieve this missing part (corresponding to the elapsed time since the beginning of the program) of the new content.

For example, the catch up service may be a solution. But prior to using such a catch up service, the replay service guide is checked, to see if the new content is available. If it is, the missing part is recorded later, from the catch up service. If the stored part of the new content (i.e. the new content except the missing part corresponding to the elapsed time since the beginning of the program) is in higher resolution (HD for example) than the same one (SD for example) over the catch up service, a rendering mechanism of the SD part and the HD part would be performed, in order for the end user to benefit from the highest visual experience. In that case just the missing part will be in lower resolution (SD for example). The video rendering aspect of performing such rendering is out of scope of the invention.

If no catch up service is available for the new content, the recommendation displayed to the end user includes a warning to check if he accepts or not to miss a part of the new content.

In a second use case, where the new content is to be stored and not consumed by the end user, the scheduled TV program recording is used.

Prior to notifying the end user, the storage device management apparatus 20 will first consult the end user's calendar and the duration of the TV program planned to be stored in order to verify if it fits with his availability. If the end user availability is confirmed, the storage device management apparatus 20 will estimate the size of the new content planned to be stored that will become the size condition threshold T to satisfy. In compliance with the end user's availability and prior to record the new content, the storage device management apparatus 20, according to this embodiment, proposes to consume a recommended content as long as the size of the recommended content is higher than the threshold T.

This action is even more relevant if the TV program planned to be stored is the next episode of a series for which the end user has still not consumed the previous one. The recommended content to consume can be a file or an aggregation of several files to satisfy the threshold T condition. The recommended content can also be split into several temporal windows as long as it is recommended in accordance with the scheduled TV program recording time and end user availability.

Figure 5:
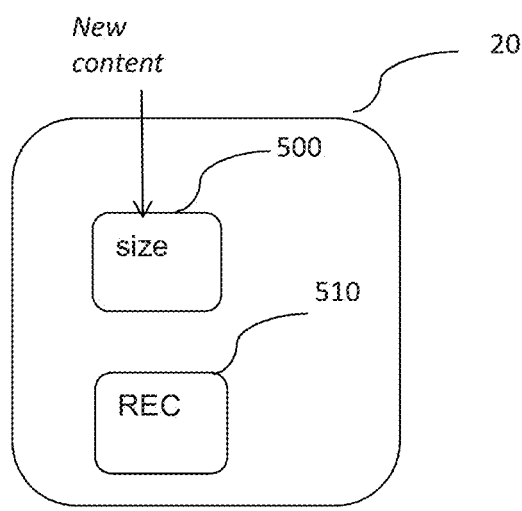
FIG. 5 illustrates an example of a simplified structure of a storage device managing apparatus according to an embodiment of the invention.

Finally, FIG. 5 presents a simplified structure of a storage device management apparatus 20, according to a particular embodiment of the invention.

The storage device management apparatus 20 comprises, for a new content:
  a determining module/device 500 configured to determine the storage size of the new content,
  a recommending module/device 510 configured to recommend to the user to store, in the storage device, the new content and to consume a stored content in the storage device, called recommended content, if the recommended content storage size is greater than the new content storage size.

Such apparatus 20 may be the storage device 15 itself, or a distinct device as a gateway, a smartphone, a STB, a personal computer, . . . connected to the storage device 15. The apparatus 20 may also be embedded in a distant server on the ISP side.

The invention claimed is:

1. A storage device management method performed by an apparatus, comprising:
  determining by the apparatus a storage size of a new audio and/or video content in the storage device, the new audio and/or video content being requested to be consumed by a user of the apparatus;
  selecting by the apparatus an audio and/or video content stored in the storage device, called recommended audio and/or video content, the storage size of the recommended audio and/or video content being greater than the storage size of the new audio and/or video content;
  displaying by the apparatus a recommendation to the user of the apparatus to consume said recommended audio and/or video content, instead of rendering the new audio and/or video content and to store the new audio and/or video content in the storage device.

2. The storage device management method according to claim 1 wherein said recommended audio and/or video content is an aggregation of several audio and/or video contents stored in the storage device.

3. The storage device management method according to claim 1, wherein the storage size of the new audio and/or video content is determined from a TV program guide.

4. The storage device management method according to claim 1, wherein the method is implemented when the storage device is switched on.

5. The storage device management method according to claim 1, further comprising determining a category and/or a sub-category of the new audio and/or video content and wherein said recommended audio and/or video content pertains to the same category and/or sub-category as said new audio and/or video content.

6. The storage device management method according to claim 1, further comprising:
  receiving a user's response indicating whether the user accepts said recommendation;
  storing said new audio and/or video content and rendering said recommended audio and/or video content if the user's response is positive.

7. The storage device management method according to claim 1, further comprising checking if there is enough remaining storage space in said storage device to ensure the rendering of said recommended audio and/or video content whilst simultaneously storing said new audio and/or video content in said storage device.

8. The storage device management method according to claim 7, wherein the checking if there is enough remaining storage space comprises comparing a remaining storage space size of the storage device with a predetermined threshold.

9. The storage device management method according to claim 1, comprising associating each stored audio and/or video content in the storage device with information indicating a number of times it has already been rendered, and selecting the recommended audio and/or video content using said information.

10. The storage device management method according to claim 1, comprising, when a rendering of said new audio and/or video content has already started:
  retrieving a part of said new audio and/or video content that has been missed for the storing, called the beginning of the new audio and/or video content;

storing said beginning of the new audio and/or video content in the storage device.

11. A non-transitory computer-readable medium comprising a computer program product recorded thereon and capable of being run by a processor, including program code instructions for implementing the storage device management method according to claim 1.

12. A storage device management device comprising:
a computer readable storage medium; and
a memory associated with at least one processor, wherein the at least one processor is configured to:
  determine by the storage device management device a storage size of a new audio and/or video content in the storage device, the new audio and/or video content being requested to be consumed by a user of the storage device management device;
  select by the storage device management device an audio and/or video content stored in the storage device, called recommended audio and/or video content, the storage size of the recommended audio and/or video content being greater than the storage size of the new audio and/or video content;
  display by the storage device management device a recommendation to the user of the storage device management device to consume said recommended audio and/or video content, instead of rendering the new audio and/or video content and to store the new audio and/or video content in the storage device.

* * * * *